United States Patent
Zhao et al.

(10) Patent No.: US 11,699,223 B2
(45) Date of Patent: Jul. 11, 2023

(54) IMAGE DATA PROCESSING METHOD, DEVICE AND SECURITY INSPECTION SYSTEM BASED ON VR OR AR

(71) Applicants: Nuctech Company Limited, Beijing (CN); Tsinghua University, Beijing (CN)

(72) Inventors: Ziran Zhao, Beijing (CN); Jianping Gu, Beijing (CN); Bicheng Liu, Beijing (CN); Qi Wang, Beijing (CN); Xi Yi, Beijing (CN)

(73) Assignees: Nuctech Company Limited, Beijing (CN); Tsinghua University, Beijing (CN)

(*) Notice: Subject to any disclaimer, the term of this patent is extended or adjusted under 35 U.S.C. 154(b) by 111 days.

(21) Appl. No.: 15/858,868

(22) Filed: Dec. 29, 2017

(65) Prior Publication Data

US 2018/0189945 A1 Jul. 5, 2018

(30) Foreign Application Priority Data

Dec. 29, 2016 (CN) .......................... 201611255796.0

(51) Int. Cl.
*G06T 7/00* (2017.01)
*G06T 15/08* (2011.01)
(Continued)

(52) U.S. Cl.
CPC ............ *G06T 7/0004* (2013.01); *G01P 13/00* (2013.01); *G01T 1/00* (2013.01); *G01V 5/0058* (2013.01);
(Continued)

(58) Field of Classification Search
None
See application file for complete search history.

(56) References Cited

U.S. PATENT DOCUMENTS 8,311,791 B1 * 11/2012 Avisar .................... G09B 23/28
703/11
9,696,795 B2 * 7/2017 Marcolina ............. G06T 19/006
(Continued)

FOREIGN PATENT DOCUMENTS

CN 101071111 11/2007
CN 102359971 2/2012
(Continued)

OTHER PUBLICATIONS

Rogers et al. "Automated X-ray Image Analysis for Cargo Security: Critical Review and Future Promise", arXiv:1608.01017v1 [cs.CV] Aug. 2, 2016 (Year: 2016).*

(Continued)

*Primary Examiner* — Randolph I Chu
(74) *Attorney, Agent, or Firm* — Knobbe, Martens, Olson & Bear LLP

(57) ABSTRACT

A method, a device and a security system for image data processing based on VR or AR are disclosed. In one aspect, an example image data processing method includes reconstructing, based on three-dimensional (3D) scanned data of a containing apparatus in which objects are contained, a 3D image of the containing apparatus and the objects contained in the containing apparatus. The reconstructed 3D image is stereoscopically displayed. Manipulation information is determined for at least one of the objects in the containing apparatus based on positioning information and action information of a user. At least a 3D image of the at least one object is reconstructed based on the determined manipulation information. The at least one reconstructed object is presented on the displayed 3D image.

11 Claims, 3 Drawing Sheets

(51) Int. Cl.
  *G06F 3/01* (2006.01)
  *G01T 1/00* (2006.01)
  *G06T 7/73* (2017.01)
  *G01P 13/00* (2006.01)
  *G01V 5/00* (2006.01)
  *G06Q 50/30* (2012.01)

(52) U.S. Cl.
  CPC ............... *G06F 3/016* (2013.01); *G06T 7/74* (2017.01); *G06T 15/08* (2013.01); *G06Q 50/30* (2013.01); *G06T 2207/10012* (2013.01); *G06T 2207/10081* (2013.01); *G06T 2207/30232* (2013.01)

(56) References Cited

U.S. PATENT DOCUMENTS

| | | | | |
|---|---|---|---|---|
| 2013/0289767 | A1* | 10/2013 | Lim | A61B 34/76 700/253 |
| 2013/0323700 | A1* | 12/2013 | Samosky | G09B 23/28 434/262 |
| 2016/0147308 | A1* | 5/2016 | Gelman | G06F 3/017 345/156 |
| 2016/0163105 | A1 | 6/2016 | Hong et al. | |
| 2016/0209335 | A1 | 7/2016 | Jiminez, Jr. et al. | |
| 2017/0065379 | A1* | 3/2017 | Cowburn | G06T 19/20 |
| 2017/0131775 | A1* | 5/2017 | Clements | G06F 3/016 |
| 2017/0258526 | A1* | 9/2017 | Lang | A61B 17/155 |
| 2017/0312031 | A1* | 11/2017 | Amanatullah | G09B 23/30 |
| 2018/0130255 | A1* | 5/2018 | Hazeghi | H04N 13/239 |
| 2018/0144556 | A1* | 5/2018 | Champion | G06F 3/0346 |
| 2018/0181199 | A1* | 6/2018 | Harvey | G06F 3/014 |
| 2019/0130630 | A1* | 5/2019 | Ackerson | G06T 15/205 |
| 2020/0249752 | A1* | 8/2020 | Parshionikar | G06F 1/163 |
| 2021/0015559 | A1* | 1/2021 | Mahfouz | A61F 2/40 |

FOREIGN PATENT DOCUMENTS

| | | |
|---|---|---|
| WO | WO 2006/134362 | 12/2006 |
| WO | WO 2008/109567 A3 | 9/2008 |

OTHER PUBLICATIONS

Firsching et al. "3-D Scanning of Sea Freight Containers Using MeVX-Rays", IEEE (Year: 2013).*

Duan et al., "X-raycargocontainerinspectionsystemwithfew-viewprojectionimaging", Nuclear Instruments and Methods in Physics Research A598(2009), p. 439-444 (Year: 2009).*

Zhu et al. "3D Measurements in Cargo Inspection with a Gamma-Ray Linear Pushbroom Stereo System", Proceedings / CVPR, IEEE Computer Society Conference on Computer Vision and Pattern Recognition. IEEE Computer Society Conference on Computer Vision and Pattern Recognition, Jan. 2005 (Year: 2005).*

Visser et al. "Automated comparison of X-ray images for cargo scanning", Proceedings of the 50th IEEE International Carnahan Conference on Security Technology, Orlando USA, Oct. 2016 (Year: 2016).*

Pierce et al. ("Image Plane Interaction Techniques In 3D Immersive Environments", 1997 Symposium on Interactive 3D Graphics). (Year: 1997).*

Avery, Benjamin, "X-Ray Vision for Mobile Outdoor Augmented Reality," University of South Australia, May 31, 2009, pgs. I-XIX, 1, XP002716488, retrieved from URL: http://search.ror.unisa.edu.au/record/UNISA_ALMA2164004640001831/media/digital/open/9915951885301831/12146717960001831/13146717590001831/pdf.

European Search Report dated Jun. 7, 2018 for European Application No. EP17211108.0, which corresponds in priority to the above-identified U.S. application.

Wang, Young-Jun et al., "Force Feedback Assisted Nasoscope Virtual Surgery Simulator," May 2001, Journal of System Simulation, vol. 13, No. 3, pp. 404-407.

Second Office Action dated Jan. 28, 2020 in European Application No. 17211108.0, which corresponds in priority to the above-identified U.S. application.

* cited by examiner

IMAGE DATA PROCESSING METHOD, DEVICE AND SECURITY INSPECTION SYSTEM BASED ON VR OR AR

CROSS-REFERENCE TO RELATED APPLICATION

This application claims priority to Chinese Patent Application No. 201611255796.0, filed on Dec. 29, 2016, entitled "IMAGE DATA PROCESSING METHOD, DEVICE AND SECURITY INSPECTION SYSTEM BASED ON VR OR AR," which is incorporated herein by reference in its entirety.

BACKGROUND OF THE DISCLOSED TECHNOLOGY

Field of the Technology

The disclosed technology relates to the security inspection field, and in particular, to an image data processing device and a security inspection system based on virtual reality (VR) or augmented reality (AR).

Description of the Related Technology

With the rapid development of container transportation business, increasing quantities of goods are contained and transported via containers. Due to the hidden nature of the goods in the container, it brings opportunities to shippers to conceal dangerous goods and smuggled goods. Although inspection technologies like X-ray transmission systems have brought great convenience to the safe transportation of containers, image viewing personnel who are responsible for watching monitors to obtain goods information only by their experience have a great burden, and thus become easily tired. On the other hand, there is still a certain percentage of the containers requiring unpacking inspection in actual practice, but there are many difficulties in such unpacking inspections. For example, the containers are often used for transporting large objects, and removing them from the containers can be complex and dangerous. In another example, the goods in the containers are tightly arranged, and there are difficulties in reassembling them after their unpacking inspection. In yet another example, procedures of unpacking inspection are generally complex and time-consuming, extending the shipping time. In addition, a direct on-site unpacking inspection of the containers in which the dangerous goods are concealed also threatens the personal safety of inspectors.

SUMMARY OF CERTAIN INVENTIVE ASPECTS

Objects of certain aspects of disclosed technology include, for example, a method, a device and a security system for image data processing based on virtual reality (VR) or augmented reality (AR).

According to an aspect of the disclosed technology, there is provided an image data processing method, including: reconstructing, based on three-dimensional (3D) scanned data of a containing apparatus in which objects are contained, a 3D image of the containing apparatus and the objects contained in the containing apparatus; stereoscopically displaying the reconstructed 3D image; determining manipulation information for at least one of the objects in the containing apparatus based on positioning information and action information of a user; reconstructing at least a 3D image of the at least one object based on the determined manipulation information; and presenting the at least one reconstructed object on the displayed 3D image.

According to another aspect of the disclosed technology, there is provided an image data processing device, including: a communication interface, configured to receive 3D scanned data of a containing apparatus in which objects are contained; and a processor, configured to reconstruct, based on the received 3D scanned data, a 3D image of the containing apparatus and the objects contained in the containing apparatus for display; wherein the communication interface is further configured to receive positioning information and action information of a user, and wherein the processor is further configured to determine manipulation information for at least one of the objects in the containing apparatus based on the received positioning information and action information, and reconstruct at least a 3D image of the at least one object based on the determined manipulation information.

According to yet another aspect of the disclosed technology, there is provided a security inspection system is provided, including: a 3D scanning device, configured to 3D scan a containing apparatus in which objects are contained to generate 3D scanned data; a location tracking device, configured to position a location of a user for providing positioning information of the user; a motion tracking device, configured to determine a motion of the user for providing action information of the user; an image data processing device as previously described; and a stereoscopic display, configured to display a reconstructed 3D image.

According to yet another aspect of the disclosed technology, a computer readable recording medium having executable instructions stored thereon, which when executed by one or more processors, cause the one or more processors to perform operations of: reconstructing, based on 3D scanned data of a containing apparatus in which objects are contained, a 3D image of the containing apparatus and the objects contained in the containing apparatus; stereoscopically displaying the reconstructed 3D images; determining manipulation information for at least one of the objects in the containing apparatus based on positioning information and action information of a user; reconstructing at least a 3D image of the at least one object based on the determined manipulation information; and presenting the at least one reconstructed object on the displayed 3D image.

For example, the 3D scanned data include at least one of X-ray Computerized Tomography (X-CT) scanned data and multi-view X-ray scanned data. These data may be obtained by, for example, a 3D scanning device, such as an X-CT scanning device or a multi-view X-ray scanning device.

At least one of structural and material properties of the at least one object may be determined based on the 3D scanned data. The determined at least one of the structural and material properties of the at least one object may be displayed around the at least one object.

The display for displaying the 3D image and various other information may be a stereoscopic display, such as a stereoscopic display of a helmet type, a glasses type, a desktop type, a projection type, a hand-held type or an auto-stereoscopic display type.

Feedback information may be determined based on the manipulation information and/or the determined at least one of the structural and material properties. The user may be provided with force/tactile feedback based on the feedback information. For example, the user may be provided with the force/tactile feedback by a force/tactile feedback device worn by the user.

The scanning device may be controlled to further scan an area where the at least one object is located based on the determined manipulation information.

According to embodiments of the disclosed technology, the (3D) image of articles within the containing apparatus (e.g., the container) may be generated by the 3D scanning device (e.g., the X-CT or the multi-view X-ray scanning device). A VR or AR space may be created by stereoscopically displaying the generated image. An inspector may be equipped with a VR or AR enabled auxiliary device to enter the VR or AR space, and may rummage and inspect suspected areas. The inspector's actions may be reflected into the virtual space in real time, and the rummage inspection process may be displayed simultaneously. Thus, the inspector can have a sense of reality of coming to the inspection spot in person by interaction with the articles within the containing apparatus in a digitalized environment using the VR or AR enabled device. Compared with the unpacking inspection on site, such a simulated inspection way vividly and simply shows the conditions of the goods in the container and the process of unpacking inspection, saving manpower, material resources and time consumed by the inspection and improving efficiency and security of operations of the container inspection.

BRIEF DESCRIPTION OF THE DRAWINGS

The above and other objects, features and advantages of the disclosed technology will be more apparent from the following preferred embodiments illustrated with reference to the figures, in which.

Throughout the drawings, like or similar reference numbers indicate like or similar parts.

DETAILED DESCRIPTION OF CERTAIN ILLUSTRATIVE EMBODIMENTS

Figure 1:
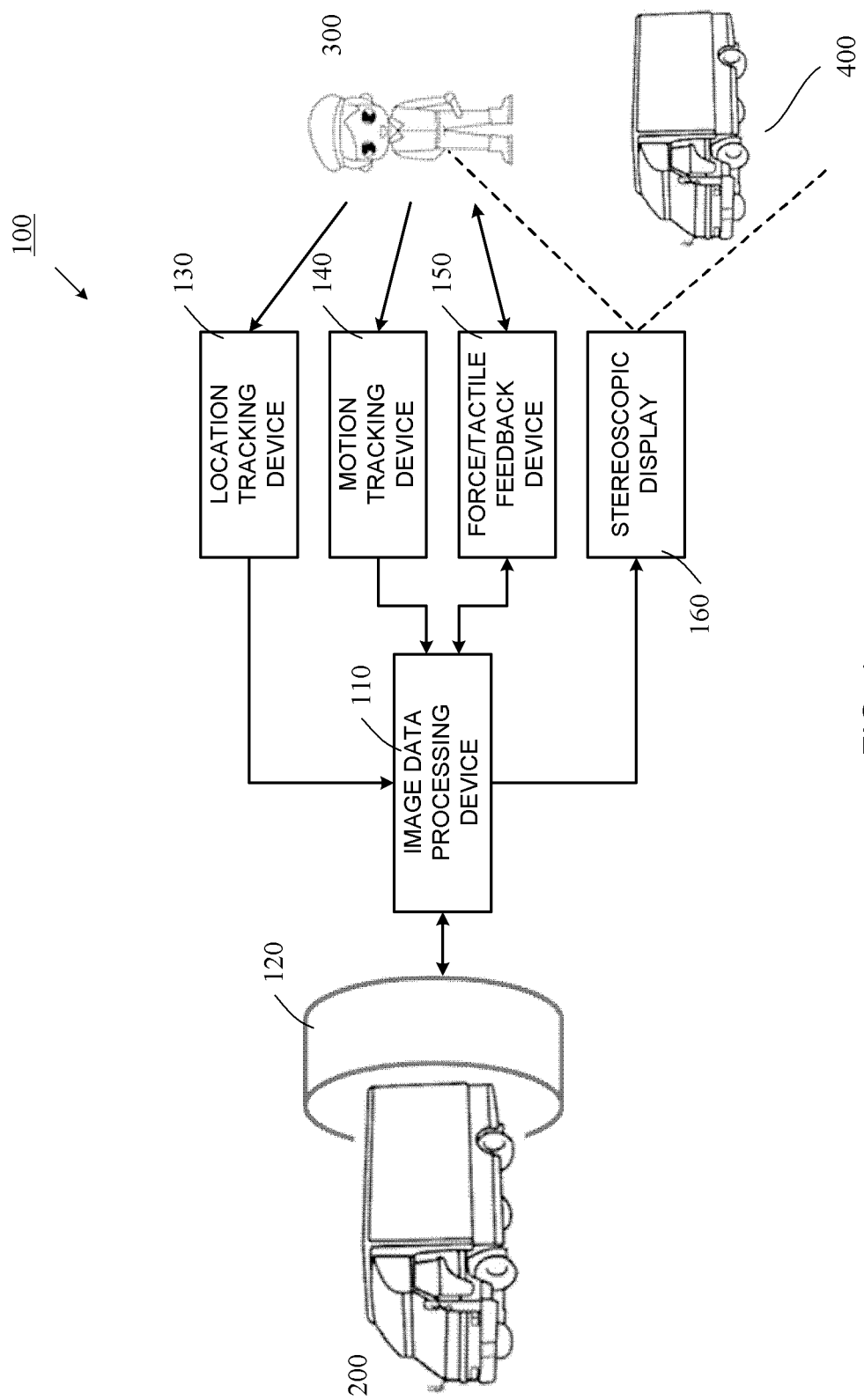
FIG. 1 is a block diagram schematically showing a security inspection system according to an embodiment of the disclosed technology.

Hereinafter, embodiments of the disclosed technology will be described with reference to the accompanying drawings. It is to be understood that such descriptions are illustrative only, but are not intended to limit the scope of the disclosed technology. In addition, in the following, descriptions of well-known structures and techniques are omitted to avoid unnecessarily obscuring the concepts of the disclosed technology.

Terms used herein are for the purpose of describing particular embodiments only, but are not intended to limit the disclosed technology. Words "a", "an" and "the" as used herein should also cover the meanings of "a plurality of", "a variety of", unless the context clearly indicates otherwise. In addition, terms "comprising", "including", "containing" and the like as used herein indicate the presence of features, steps, operations and/or components, but do not exclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present specification and should not be interpreted in an idealized or overly formal manner.

Some block diagrams and/or flowcharts are shown in the accompanying drawings. It should be understood that some of blocks or combinations thereof in the block diagrams and/or flowcharts may be implemented by computer program instructions. The computer program instructions may be provided to a general purpose computer, a dedicated computer, or processors of other programmable data processing apparatuses, so that the instructions, when being executed by the processor, may create technologies and/or means for implementing functions/operations as described in the block diagrams and/or flowcharts.

Thus, the techniques of the disclosed technology may be implemented in forms of hardware and/or software (including firmware, microcode, etc.). In addition, the techniques of the disclosed technology may be embodied in a form of a computer program product on a computer readable medium storing instructions. The computer program product may be used by an instruction execution system or in conjunction with an instruction execution system. In the context of the disclosed technology, the computer readable medium may be any medium capable of containing, storing, transmitting, propagating, or transmitting instructions. For example, the computer readable media may include, but not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

FIG. 1 is a block diagram schematically showing a security inspection system according to an embodiment of the disclosed technology.

As shown in FIG. 1, a security inspection system 100 according to this embodiment may include an image data processing device 110, a three dimensional (3D) scanning device 120 and a stereoscopic display device 160. Such a security inspection system 100 may be applied to places, such as stations, airports, customs etc., where articles need to be inspected to prevent entry of contraband.

The 3D scanning device 120 may perform 3D scanning on a target, e.g., a containing apparatus (e.g., a container) 200 in which objects are contained, so as to generate 3D scanned data. Here, the "3D scanned data" refers to data, based on which a 3D profile of the scanned target can be reconstructed to obtain a 3D image of the scanned target. For example, the 3D scanning device 120 may include an X-ray Computerized Tomography (X-CT) scanning device, a multi-view X-ray scanning device, etc.

In an example, a security inspection channel may be arranged, and a radiation source (e.g., an X-ray generator) and corresponding detector(s) may be deployed around the security inspection channel. The target to be scanned may pass through the security inspection channel (e.g., by a transfer device, a transport vehicle, etc.). When the target passes through the security inspection channel, radiation emitted by the radiation source may irradiate the target, and transmitted (and/or scattered) by the target to be detected by the detector(s). According to the detected radiation, information inside the target may be learned. For example, in the scanning device, such as the X-CT scanning device or the multi-view X-ray scanning device, a cross-section of the target may be reconstructed according to the detected radiation, and the 3D profile of the target may be generated based on a plurality of such reconstructed cross-sections.

In addition, the dual-energy scanning technology may be used. For example, the target may be scanned using high-energy and low-energy X-rays. Using the dual-energy scanning technology, material properties, such as an equivalent atomic coefficient, density, etc., of the target may be obtained in a better way. However, the dual-energy scanning is not definitely necessary, e.g., in a case that single-energy scanning is sufficient to determine desired material information.

A speed of the scanning may be controlled to get a certain amount of scanned data. The amount of the scanned data is sufficient, on one hand, to generate a clear image, and on the other hand, may not be too much, in order to reduce storage and processing burdens.

Here, a containing apparatus for accommodating the objects, such as a container, may be described as an example, but the disclosed technology is not limited to this. The technology of the disclosed technology is suitable for various security inspection scenarios.

The image data processing device 110 may reconstruct a 3D image of the target, e.g., the container and the object(s) accommodated therein, based on the 3D scanned data generated by the 3D scanning apparatus 120. For example, the image data processing device 110 may detect edges of each object from the 3D scanned data by using edge detection technology, and may match the edges of the same object at different viewing angles, so as to reconstruct the cross-section of the object. By connecting a plurality of cross-sections of the same object (and possibly interpolating between the cross-sections), the 3D profile of the object may be obtained. On the other hand, the material properties, such as the equivalent atomic coefficient, the density value etc., of the object may be calculated based on the reconstructed cross-section.

The stereoscopic display device 160 may stereoscopically display the 3D image reconstructed by the image data processing device 110. In this way, an image space, e.g., a virtual reality (VR) or augmented reality (AR) space 400 (hereinafter referred to as "a virtual space") is created. Such a virtual space does not necessarily be a physical space in the real world, but may be a space that can be perceived by the user 300's vision. For example, the eyes of the user 300 may receive light signals from the display device, so as to perceive as if he was exposed to a certain space (in this example, the internal space of the target to be inspected).

The stereoscopic display device 160 for displaying the 3D image (in real time) may be of a helmet type, a glasses type, a desktop type, a projection type, a hand-held type or an auto-stereoscopic display type etc. For example, in a case of a single user, the user may wear the helmet-type or glasses-type display device; while in a case of multiple users, the desktop-type, the projection-type, the hand-held type or the auto-stereoscopic display-type display device may be used.

According to an embodiment of the disclosed technology, it may be determined whether there is contraband such as explosive, weapons or the like based on the material properties, such as the equivalent atomic number and the density value. For example, the atomic numbers and the densities in the plurality of cross-sections may be averaged. If the resultant average value falls within a contraband area in a contraband database, it may be determined that there is contraband; if the average value falls into other areas than the contraband area, it may be determined as a safety product. Objects that are determined to be contraband may be highlighted to alert the user.

According to an embodiment of the disclosed technology, the detected object may be compared with a list of items (e.g., a declaration of customs) based on the structure (e.g., 3D profile) and/or material properties of the object. If the detected object matches an object listed in the list of items, relevant information (e.g., an item name, a manufacturer, etc.) in the list of items may be displayed (e.g., in a form of text) around the corresponding object. If there is no item in the list of items matched with some detected object, the user is alerted.

In addition, the determined structural and/or material properties may also be displayed (e.g., in the form of text) around the respective objects for facilitating the user to view.

The security inspection system 100 may further include various sensing devices, such as a location tracking device 130 and a motion tracking device 140, for sensing location and motion of the user, in order to determine which one of the objects and how the user desires to manipulate. These sensing devices may be wearable, so as to be worn by the user on his/her body; or may be provided separately from the user.

The location tracking device 130 may position the location of the user to provide positioning information of the user. The image data processing device 110 may map the positioning information of the user determined by the location tracking device 130 into the image space or the virtual space. For example, an initial location of the user may be mapped to an entrance of the container, and the location of the user in the virtual space may be changed accordingly based on the user's movement determined by the positioning information. For example, when it is determined based on the positioning information that the user moves leftward/rightward/forward/backward by a certain distance, the location of the user in the virtual space may be moved leftward/rightward/forward/backward relative to the initial location by a corresponding distance, which may be identical with an actual moving distance of the user, or scaled by a certain factor.

For example, the location tracking device 130 may include a Global Positioning System (GPS) device carried by the user, an ultrasound positioning device carried by the user and co-located with an ultrasonic transceiver arranged around the user, or a video device. In a case of the video device, the user's movement may be determined by image recognition.

The location tracking device 130 may include a plurality of location sensors provided at different parts of the user's body. The image data processing device 110 may respectively map the different parts of the user into the virtual space according to the sensed data of the plurality of location sensors, so as to more accurately locate the location of the user in the virtual space.

The motion tracking device 140 may determine the user's motion in order to provide action information of the user. For example, the motion tracking device 140 may track certain key points (e.g., joints, hands, etc.) of the user, and capture motion data of the user. For example, the motion tracking device 140 may include data clothing. The image data processing device 110 may map these motion data onto a (pre-stored) human body model, and may generate a continuous process of body motion by motion control.

The image data processing apparatus 110 may determine manipulation information for at least one of the objects based on the positioning information and the action information of the user. For example, when it is determined based on the positioning information that the user is located besides some object, and it is determined based on the action information that the user makes an action, such as moving, turning over, etc., the image data processing device 110 may determine the manipulation information for the object (translation/rotation, a translation distance, a rotation angle, etc.). The translation distance and the rotation angle may be determined according to a magnitude of the action.

When the user manipulates the object in the virtual space, the display in the virtual space may be updated accordingly. For example, the image data processing apparatus 110 may at least partially reconstruct the 3D image (e.g., reconstructing a 3D image of the manipulated object, and, optionally, reconstructing a 3D image of a region around the manipulated object, and, of course, reconstructing the entire 3D image), based on the manipulation information. For example, when the manipulation information indicates a translation manipulation, the 3D image of the object may be reconstructed to a location to which the object is translated, and the object may be removed from its original location. In another example, when the manipulation information indicates a rotation manipulation, the object is reconstructed from different angles of view depending on its rotating angle. As such, it appears to the user as if he is really manipulating the object.

As described above, the user may operate on the object which is alerted to possibly be contraband, in order to inspect the object more carefully. After an object is determined to be a manipulation target, the structural and/or material properties of the object may be displayed around the object for user's reference.

According to an embodiment of the disclosed technology, after an object is determined to be a manipulation target, the image data processing device 110 may send an instruction to the 3D scanning device 120 to further scan the area where the object is located, e.g., to scan the area with a higher intensity and/or at denser scanning intervals, for clearer details. The image data processing device 110 may re-reconstruct (e.g., herein also referred to as reconstruct) the image of the area based on re-scanned data, and update the display of the area.

According to an embodiment of the disclosed technology, it is also possible to provide a perceptive feedback to the user in order to provide the user with more realistic feeling. To this end, the security inspection system 100 may also include a force/tactile feedback device 150. The force/tactile feedback device 150 may reflect physical characteristics, such as texture, material, and state (such as a liquid state, a solid state, a gel state, etc.), and movement changes of the object in the virtual space to the user through tactile sensing. For example, the force/tactile feedback device 150 may give a certain stimulus to the user, so that the user may obtain some sense of perception. For example, the force/tactile feedback device 150 may include data glove(s), within which some contacts that may be vibrated are mounted to simulate tactile sensation.

The image data processing device 110 may determine feedback information based at least in part on the manipulation information and/or at least one of the structural and material properties of the object. For example, when the user is manipulating the object, he may feel some reaction force. Therefore, the force received by the user may be determined based on the manipulation information, and the user may be given the feeling of such a reaction force by the force/tactile feedback device 150. For example, when the user is moving an object with both his hands, he may feel a weight of the object. The force/tactile feedback device 150 may enable the user to have such a feeling by applying a downward force to the user. The amount of the force applied may be determined based on a volume, a density value or the like of the object. In addition, there may be some concave-convex or texture on a surface of the object. Such concave-convex or texture on the surface may be determined according to the structural/material properties. The force/tactile feedback device 150 may give the user a feeling of concave-convex or texture by adjusting the contacts. In addition, the different material of the object will give different tactile sensations, such as smooth or rough. Such a tactile sensation may be given to the user by the force/tactile feedback device 150.

On the other hand, the force/tactile feedback device 150 may also analyze the user's motion parameters, such as a direction, a velocity, an acceleration, etc. For example, a position sensor, a bending sensor and a distortion sensor etc. may be installed at fingers of the data glove, and a curvature sensor, a radian sensor etc. may be installed at a palm portion of the data glove. With such a data glove, motion data, such as locations, orientations of hands and joints, finger's states (close together or open, upturned or bent down), may be determined. The image data processing device 110 may determine manipulations, such as fetching, moving, assembling, or controlling, on the object in the virtual space, based on these motion data (in conjunction with the data of the motion tracking device 140). This motion-sensing function may be incorporated into the motion tracking device 140. However, e.g., in the case of the data glove, since both the motion sensing and tactile feedback are provided in the hand part, they are integrated in the same device, e.g., the data glove.

In the above examples, the image data processing device 110 in a centralized form has been described, but the disclosed technology is not limited thereto. For example, the image data processing device 110 may be implemented in a distributed manner, including a plurality of processing devices connected by wired and/or wireless links. These processing devices cooperate to accomplish the functions of the image data processing device 110 as described above. In one example, the image data processing device 110 may include an image processor for image reconstruction and a data processing device for processing other information (e.g., sensor information, manipulation information, feedback information, etc.). The image processor may undertake the image reconstruction with a heavier load, and may have a higher configuration for a faster processing speed (e.g., updating the 3D image in real time to provide the user with a realistic feeling). On the other hand, the data processing device is responsible for other information processing with a lighter load, and may have a lower configuration, e.g., implemented by a general-purpose computing platform, such as a personal computer (PC), a notebook computer, a tablet computer etc.

Figure 2:
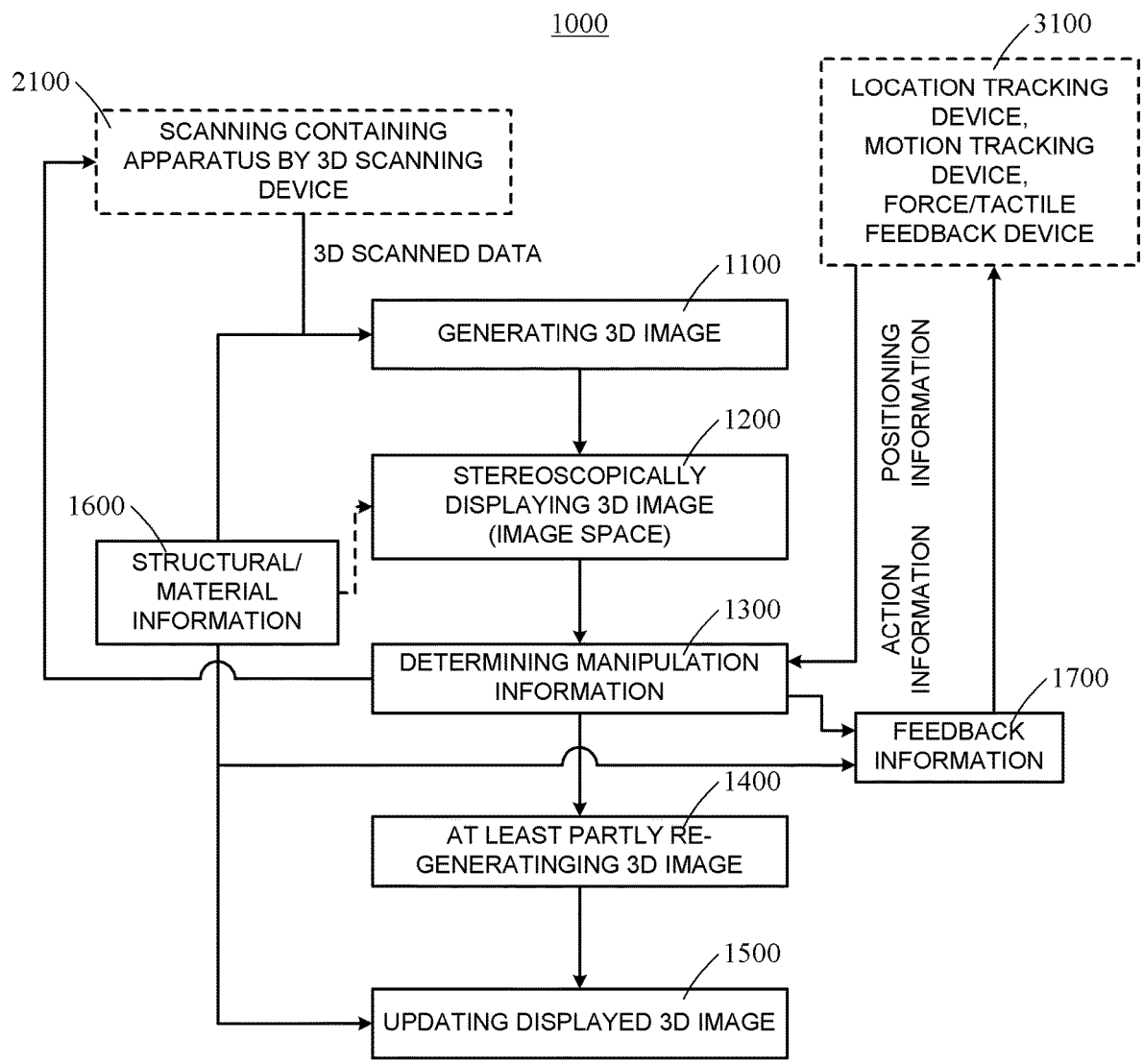
FIG. 2 is a flowchart schematically illustrating an image data processing method according to an embodiment of the disclosed technology.

FIG. 2 is a flowchart schematically illustrating an image data processing method according to an embodiment of the disclosed technology.

As shown in FIG. 2, the image data processing method 1000 according to this embodiment includes generating a 3D image based on 3D scanned data at operation 1100. As described above, the 3D scanned data may be obtained by scanning an inspected target (e.g., a containing apparatus which contains objects) by a 3D scanning device at operation 2100.

At operation 1200, the generated 3D image may be displayed stereoscopically, so as to create an image space, e.g., a virtual space (VR or AR space). As described above, the structural and/or the material properties of the objects may be determined based on the 3D scanned data, and the determined structural and/or material properties may be displayed around the respective objects at operation 1600.

At operation 1300, manipulation information for at least one of the objects may be determined based on positioning information and action information of the user. For example, the positioning information and the action information of the user may be determined by a location tracking device, a motion tracking device (and optionally, a force/tactile feedback device) at operation 3100. As described above, the 3D scanning device may be instructed based on the manipulation information to further scan an area around the manipulated object.

At operation 1400, the 3D image may be re-generated at least partially based on the determined manipulation information. As described above, the manipulated object may be reconstructed, the area around the object may be reconstructed, or even the entire 3D image may be reconstructed. For example, a location, an orientation, etc. of the object in the virtual space may be changed according to the user's manipulation.

At operation 1500, the 3D image may be updated so as to present the re-generated portion.

Additionally, at operation 1700, feedback information may be determined based on at least one of the manipulation information, the structural property, and the material property. The feedback information may be transmitted to the force/tactile feedback device so as to provide the user with a tactile feedback.

Figure 3:
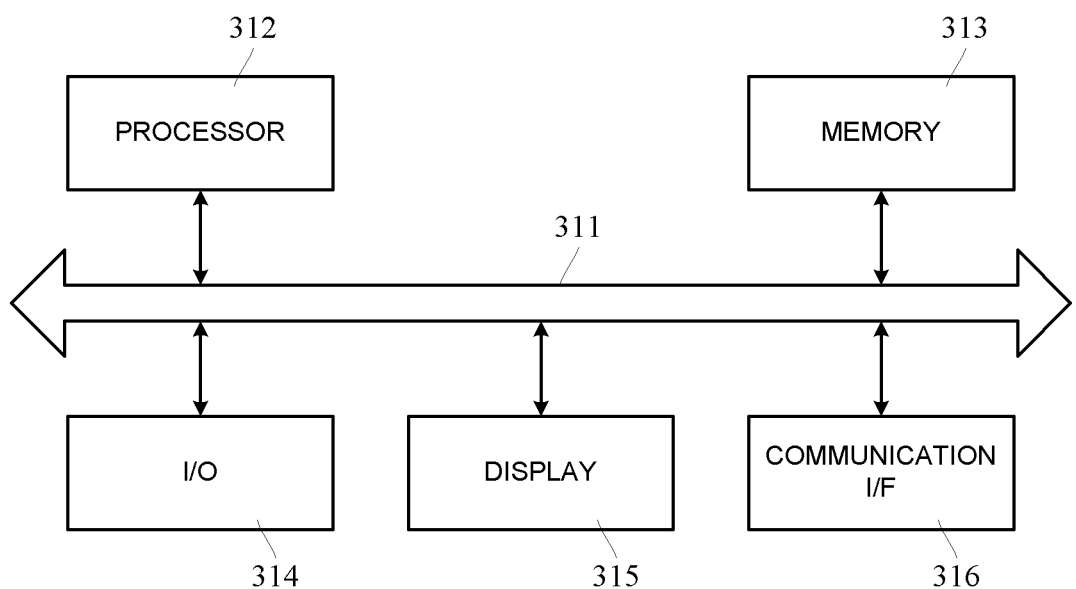
FIG. 3 is a block diagram schematically showing an image data processing device according to an embodiment of the disclosed technology.

FIG. 3 is a block diagram schematically illustrating an image data processing device according to an embodiment of the disclosed technology.

As shown in FIG. 3, the image data processing device 310 (e.g., the image data processing device 110 as described above) according to this embodiment may include a bus 311, a processor 312, a memory 313, an input/output (I/O) interface 314, a display 315 and a communication interface 316. In various embodiments of the disclosed technology, at least one of the above elements may be omitted, or other elements may be added to the processing device 310.

The bus 311 may connect the above components 312 to 316 to each other, and communicate (e.g., control messages and/or data) between the above components.

The processor 312 may include, for example, a central processing unit (CPU), an application processor (AP) or a communication processor (CP), etc. The processor 312 may perform data processing or operations related to communication and/or control of at least one other component of the processing device 310.

The memory 313 may include a volatile memory and/or a non-volatile memory. The memory 313 may store instructions or data related to at least one other component in the processing devices 310. According to the embodiments of the disclosed technology, the memory 313 may store software and/or programs. The processor 312 may perform corresponding operations, such as those described above in connection with FIG. 2, by executing the software and/or programs stored in memory 313.

The I/O interface 314 may be used to communicate instructions or data input from the user or other external devices to other components of the processing device 310. In addition, the I/O interface 314 may output instructions or data received from other components of the processing device 310 to the user or the other external devices.

The display 315 may include, for example, a liquid crystal display (LCD), a light emitting diode (LED) display, an organic light emitting diode (OLED) display, etc. The display 315 may present various contents (e.g., text, images, video, etc.) to e.g. the user. The display 315 may include a touch screen and may receive a touch input.

The communication interface 316 may communicate between the processing device 310 and other devices (e.g., the scanning device 120, the location tracking device 130, the motion tracking device 140, the force/tactile feedback device 150, the stereoscopic display device 160). For example, the communication interface 316 may be connected to a network, such as a computer network (e.g., a local area network (LAN), a wide area network (WAN), the Internet), via wireless communication or wired communication to communicate with other devices.

Wireless communication may use cellular communication protocols, such as Long Term Evolution (LTE), Code Division Multiple Access (CDMA), Wideband CDMA (WCDMA) or Global System for Mobile communications (GSM) etc. Wireless communications may include, for example, short range communications, such as Wi-Fi, Bluetooth, Near Field Communication (NFC), etc. Wired communications may include Universal Serial Bus (USB) etc. A high-speed private network or the Internet may be used for communications in real time.

The embodiments of the disclosed technology have been described above. However, these embodiments are for illustrative purposes only, but are not intended to limit the scope of the disclosed technology. Although the respective embodiments have been described above separately, it does not mean that the measures in the various embodiments cannot be advantageously used in combination. The scope of the disclosed technology is defined by the appended claims and their equivalents. Various alternatives and modifications may be made by the skilled in the art without departing from the scope of the disclosed technology, and such alternatives and modifications should fall into the scope of the disclosed technology.

The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments.

What is claimed is:

1. An image data processing method for security inspection, comprising:
   reconstructing, based on three-dimensional (3D) scanned data of a containing apparatus in which objects are contained, a 3D image of the containing apparatus and the objects contained in the containing apparatus;

stereoscopically displaying the reconstructed 3D image in a virtual space;

determining structural and material properties of at least one object, based on the 3D scanned data;

displaying the determined structural and material properties of the at least one object around the at least one object;

determining manipulation information for the at least one object in the containing apparatus based on positioning information and action information of a user being mapped to the virtual space, wherein the positioning information of the user is provided by positioning a location of the user;

determining feedback information for the user based at least in part on the manipulation information and/or at least one of the structural and material properties of the at least one object, wherein determining the feedback information based at least in part on the manipulation information comprises determining, according to the manipulation information, and a volume and a density value of the at least one object, a direction and an amount of a reaction force applied by the at least one object on the user;

providing the user with a perceptive feedback based on the feedback information, wherein providing the user with the perceptive feedback based on the feedback information comprises applying, according to the determined direction and amount of the reaction force, the reaction force to the user via a force/tactile feedback device worn by the user and a communication interface;

reconstructing at least a 3D image of the at least one object based on the determined manipulation information; and presenting the at least one reconstructed object on the displayed 3D image.

2. The image data processing method of claim 1, wherein the 3D scanned data comprise at least one of X-ray Computerized Tomography (X-CT) scanned data and multi-view X-ray scanned data.

3. The image data processing method of claim 1, further comprising:

controlling a scanning device which generates the 3D scanned data to further scan an area where the at least one object is located, based on the determined manipulation information.

4. The image data processing method of claim 3, wherein the scanning device is controlled to further scan the area where the at least one object is located, and wherein the further scan has an increased intensity or denser scanning interval.

5. An image data processing device for security inspection, comprising:

a communication interface, configured to receive three-dimensional (3D) scanned data of a containing apparatus in which objects are contained; and a processor, configured to reconstruct, based on the received 3D scanned data, a 3D image of the containing apparatus and the objects contained in the containing apparatus for display in a virtual space, wherein the communication interface is further configured to receive positioning information and action information of a user to be mapped to the virtual space, wherein the positioning information of the user is provided by positioning a location of the user;

wherein the processor is further configured to determine structural and material properties of at least one object, based on the 3D scanned data, determine manipulation information for the at least one object in the containing apparatus based on the received positioning information and action information to be mapped to the virtual space, determine feedback information for the user based at least in part on the manipulation information and/or at least one of the structural and material properties of the at least one object, provide the determined feedback information to a force/tactile feedback device worn by the user via the communication interface, and reconstruct at least a 3D image of the at least one object based on the determined manipulation information, wherein the communication interface is further configured to transmit the determined structural and material properties to a display to be displayed around the at least one object, wherein determining the feedback information for the user based at least in part on the manipulation information comprises determining, according to the manipulation information, and a volume and a density value of the at least one object, a direction and an amount of a reaction force applied by the at least one object on the user, and wherein providing the determined feedback information to the force/tactile feedback device worn by the user via the communication interface comprises applying, according to the determined direction and amount of the reaction force, the reaction force to the user via the force/tactile feedback device worn by the user and the communication interface.

6. The image data processing device of claim 5, wherein the 3D scanned data comprise at least one of X-ray Computerized Tomography (X-CT) scanned data and multi-view X-ray scanned data.

7. The image data processing device of claim 5, wherein the processor is further configured to generate, based on the determined manipulation information, a control instruction to further scan an area where the at least one object is located by a scanning device which generates the 3D scanned data, and transmit the generated control instruction to the scanning device via the communication interface.

8. A security inspection system, comprising:

a three-dimensional (3D) scanning device, configured to 3D scan a containing apparatus in which objects are contained to generate 3D scanned data;

a location tracking device, configured to position a location of a user for providing positioning information of the user;

a motion tracking device, configured to determine a motion of the user for providing action information of the user;

an image data processing device comprising:

a communication interface, configured to receive three-dimensional (3D) scanned data of the containing apparatus in which objects are contained; and a processor, configured to reconstruct, based on the received 3D scanned data, a 3D image of the containing apparatus and the objects contained in the containing apparatus for display in a virtual space, wherein the communication interface is further configured to receive positioning information and action information of a user to be mapped to the virtual space, wherein the processor is further configured to determine structural and material properties of at least one object, based on the 3D scanned data, determine manipulation information for the at least one object in the containing apparatus based on the received positioning information and action information to be mapped to the virtual space, determine feedback information for the user based at least in part on the manipulation information and/or at least one of structural and material properties of the at least one object, and reconstruct at least a 3D image of the at least one object based on the determined manipulation information, wherein the communication interface is further configured to transmit the determined structural and material properties to a stereoscopic display to be displayed around the at least one object, and wherein determining the feedback information based at least in part on the manipulation information comprises determining, according to the manipulation information, and a volume and a density value of the at least one object, a direction and an amount of a reaction force applied by the at least one object on the user;

a wearable force/tactile feedback device, configured to provide a force/tactile feedback to the user, wherein providing the force/tactile feedback to the user comprises applying, according to the determined direction and amount of the reaction force, the reaction force to the user via the force/tactile feedback device worn by the user and the communication interface; and the stereoscopic display, configured to display a reconstructed 3D image.

9. The security inspection system of claim 8, wherein the 3D scanning device comprises at least one of an X-ray Computerized Tomography (X-CT) scanning device and a multi-view X-ray scanning device.

10. The security inspection system of claim 9, wherein the motion tracking device comprises data clothing.

11. The security inspection system of claim 9, wherein the stereoscopic display comprises a stereoscopic display of a helmet type, a glasses type, a desktop type, a projection type, a hand-held type or an auto-stereoscopic display type.

* * * * *